United States Patent [19]
Roberts

[11] Patent Number: 5,246,171
[45] Date of Patent: Sep. 21, 1993

[54] DRIP IRRIGATION TAPE INCLUDING A SERIES OF ALTERNATELY OFFSET ELONGATED CHAMBERS

[76] Inventor: James C. Roberts, 700 Ranchero Dr., San Marcos, Calif. 92069-3093

[21] Appl. No.: 884,643

[22] Filed: May 21, 1992

Related U.S. Application Data

[63] Continuation-in-part of Ser. No. 712,201, Jun. 6, 1991, abandoned.

[51] Int. Cl.⁵ ............................ B05B 1/02; B05B 15/00
[52] U.S. Cl. ................................................... 239/542
[58] Field of Search .................... 239/542, 547, 566

[56] References Cited

U.S. PATENT DOCUMENTS

| | | | |
|---|---|---|---|
| 3,860,179 | 1/1975 | Costa | 239/542 |
| 3,870,236 | 3/1975 | Sahagun-Barragan | 239/542 |
| 3,903,929 | 9/1975 | Mock | 138/115 |
| 4,009,832 | 3/1977 | Tiedt | 239/542 |
| 4,022,384 | 5/1977 | Hoyle et al. | 239/542 |
| 4,047,995 | 9/1977 | Leal-Diaz | 156/203 |
| 4,126,998 | 11/1978 | Gilead | 405/51 |
| 4,173,309 | 11/1979 | Drori | 239/542 |
| 4,175,882 | 11/1979 | Gilead | 405/43 |
| 4,177,946 | 12/1979 | Sahagun-Barragan | 239/542 |
| 4,247,051 | 1/1981 | Allport | 239/542 |
| 4,285,472 | 8/1981 | Okada et al. | 239/542 |
| 4,385,727 | 5/1983 | Spencer | 239/107 |
| 4,413,787 | 11/1983 | Gilead et al. | 239/542 |
| 4,473,191 | 9/1984 | Chapin | 239/542 |
| 4,474,330 | 10/1984 | Langa | 239/450 |
| 4,534,515 | 8/1985 | Chapin | 239/542 |
| 4,541,569 | 9/1985 | Langa | 239/450 |
| 4,626,130 | 12/1986 | Chapin | 405/44 |
| 4,722,759 | 2/1988 | Roberts et al. | 156/203 |
| 4,763,842 | 8/1988 | Dunn | 239/542 |
| 4,807,668 | 2/1989 | Roberts | 138/103 |
| 5,118,042 | 6/1992 | Delmer | 239/542 |

FOREIGN PATENT DOCUMENTS

| | | |
|---|---|---|
| 2643377 | 4/1979 | Australia . |
| 2603077 | 7/1981 | Australia . |
| 0129151 | 12/1984 | European Pat. Off. . |
| 2835117 | 2/1979 | Fed. Rep. of Germany . |
| WO9004464 | 5/1990 | PCT Int'l Appl. . |
| 1484588 | 9/1977 | United Kingdom . |

Primary Examiner—Andres Kashnikow
Assistant Examiner—William Grant
Attorney, Agent, or Firm—Brown, Martin, Haller & McClain

[57] ABSTRACT

A drip irrigation tape is formed from a strip of flexible material having a series of spaced indented grooves of serpentine shape extending along one side edge, the strip being folded with its opposite side edges overlapping and sealed together on opposite sides of the grooves to form a main conduit within the folded strip and a series of secondary conduits along the grooves. Breaks in the seal form inlets between the main conduit and each secondary conduit, and raised outlet ports connect the secondary conduit to the exterior of the tape. The grooves each have a series of elongated chambers offset alternately on opposite sides of the grooved region and interconnected by orifices of smaller dimensions than the chambers. An apparatus for forming the tape includes a shaping drum with channels connected via suction ports to a vacuum source for pulling the strip material into the channels to form the grooves, the vacuum connection being arranged to direct the vacuum only to the region of the drum over which the strip is passing.

25 Claims, 7 Drawing Sheets

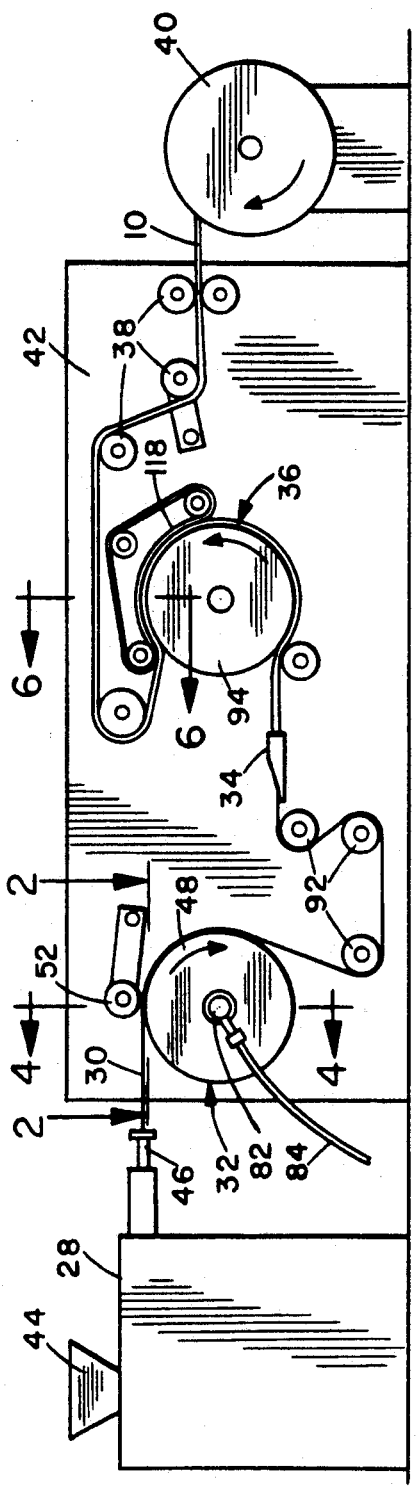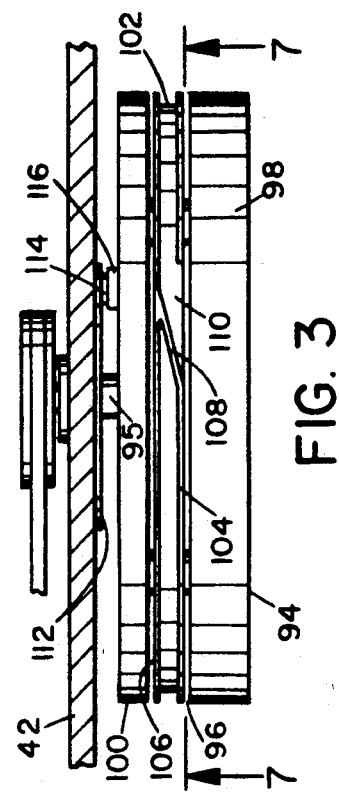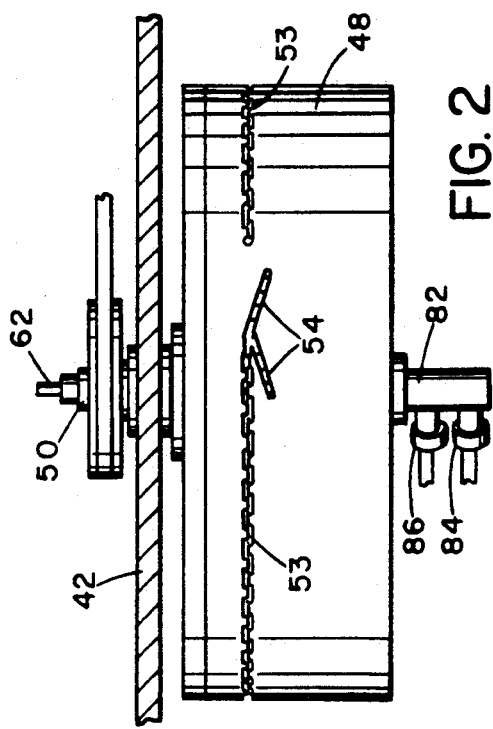

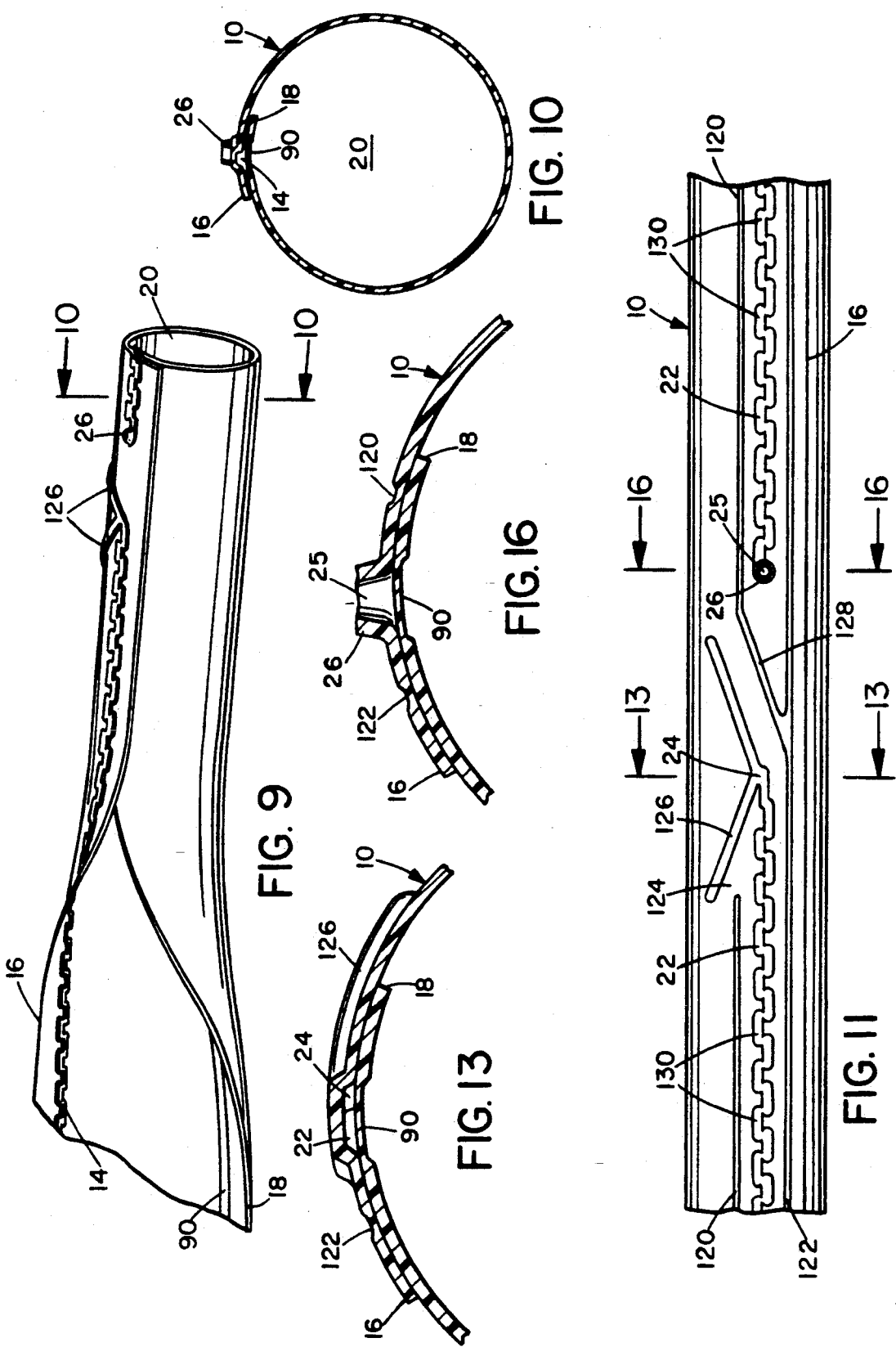

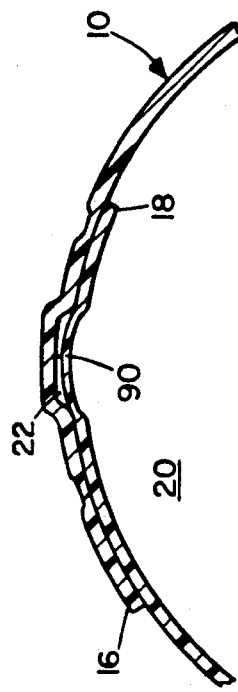
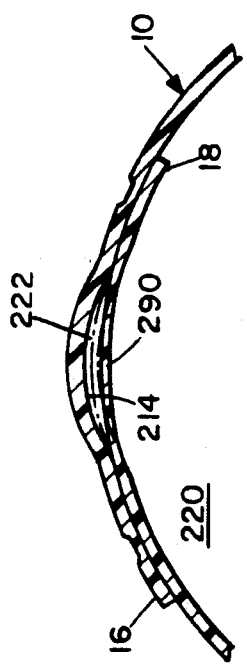
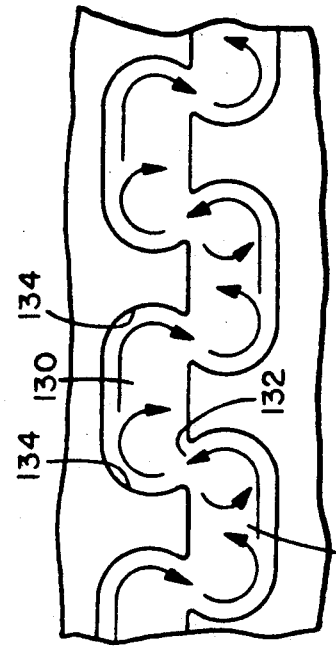
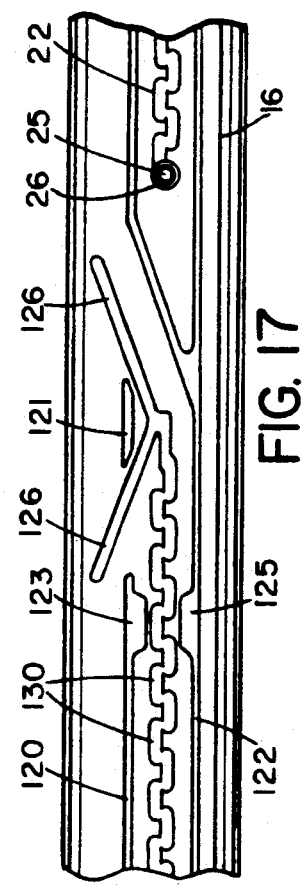
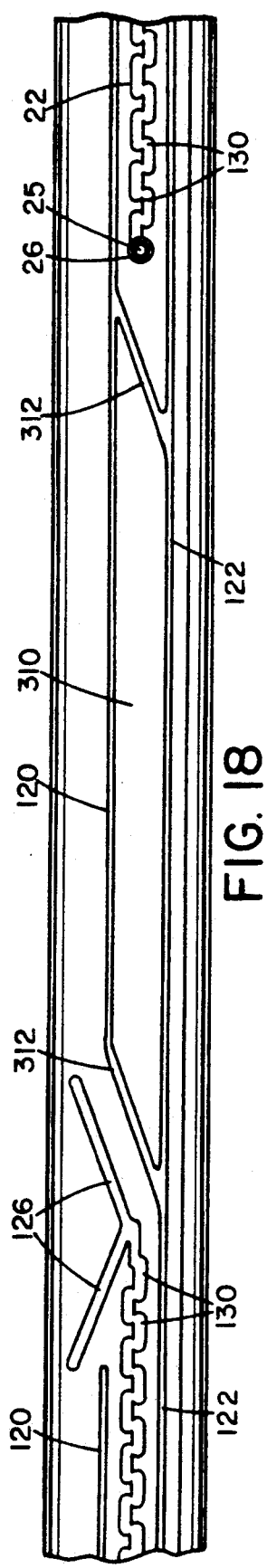

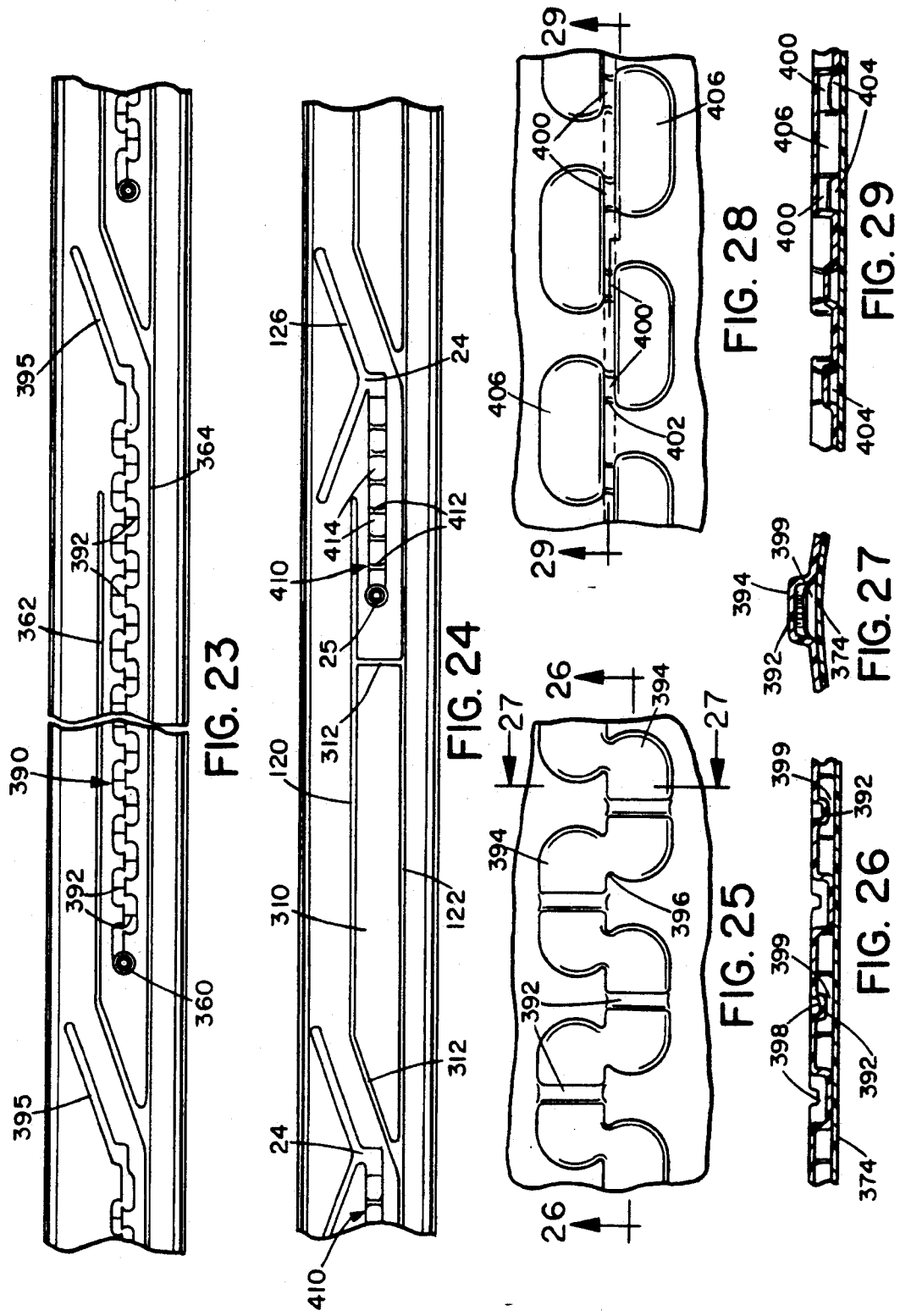

DRIP IRRIGATION TAPE INCLUDING A SERIES OF ALTERNATELY OFFSET ELONGATED CHAMBERS

CROSS-REFERENCES TO RELATED APPLICATIONS

This is a continuation-in-part of application Ser. No. 07/712,201 filed Jun. 6, 1991, now abandoned.

BACKGROUND OF THE INVENTION

The present invention relates generally to drip irrigation tape and its manufacture.

Drip irrigation systems are commonly used in agriculture and horticulture to conserve water and reduce costs. The drip irrigation system comprises lengths of plastic tubing or tape placed near the roots of plants, either above ground or embedded in the earth, the tape having numerous small outlets supplying drops of water continuously to the plants. As well as conserving water, this arrangement provides a more uniform water supply to plants, improving crops and reducing salt accumulation and fertilizer loss in the soil.

Drip irrigation tape is commonly fabricated today from a thin pliable plastic strip folded lengthwise. The two edges are overlapped and joined together to form a flat hollow tape that may be of the order of one inch wide. Under pressure, the tape opens out into a generally cylindrical form to provide the main conduit for irrigation water flowing to crops or other plants under irrigation. The tape also includes a much smaller secondary conduit, usually located along the seam formed by the overlapping side edges of the plastic strip, and connected to the main conduit to form a narrower passageway to reduce the rate at which water is emitted into the soil. The water trickles out of a series of outlets along the secondary conduit. One problem in such tapes is to ensure uniform drip rate along the tape. This problem is particularly acute in cases where extremely long runs of tape are to be used. Currently, the maximum run of tape which can be used from a water supply is around 600 to 700 feet before a relatively large reduction in drip rate will be encountered. This can be a problem in large crop regions to be irrigated.

In my previous U.S. Pat. Nos. 4,722,759 and 4,807,668, a drip irrigation tape is described in which a strip of flexible material is formed with an indented groove extending lengthwise adjacent one side edge of the strip, and the other side edge is folded over lengthwise to overlap the groove and form the main conduit within the interior of the tape. The overlapping side edges are sealed together on opposite sides of the groove to form a seam in which the groove forms a secondary conduit. Spaced inlets are provided between the main conduit and secondary conduit, and spaced outlets lead from the secondary conduit to the exterior of the tape, so that fluid supplied to the main conduit flows into the secondary conduit and leaks slowly out of the outlets into the surrounding soil.

In U.S. Pat. No. 4,722,759 a method of fabricating such tape is described, in which a straight, continuous or segmented groove is formed along the side edge of the strip on a vacuum drum. However, there is some advantage in providing a non-straight flow path along the secondary conduit to create some turbulence in the fluid, tending to shift any debris which might otherwise block the conduit. The tortuous or winding flow path will also reduce the flow rate and allow the dimensions of the secondary conduit to be increased while providing the same drip rate as a corresponding straight conduit, further reduce the risk of debris blocking the channel. Drip irrigation tape with a winding or serpentine secondary conduit is described, for example, in U.S. Pat. No. 4,177,946 of Sahagun-Barragan, U.S. Pat. No. 4,473,191 of Chapin, and in my co-pending application Ser. No. 07/485,778 filed Feb. 22, 1990.

There are problems in manufacturing tape with a winding or serpentine secondary conduit. In Sahagun-Barragan, the tape is formed from two sheets, one of which is embossed to form a winding channel. In Chapin, the winding channels are formed by a pair of paired ribbons of adhesive or hot melt polymer between two flat sheets of plastic film, causing problems in maintaining uniformity of the channel cross section along its length. In my co-pending application Ser. No. 07/485,778 referred to above, a method and apparatus for manufacturing irrigation tape with a winding secondary conduit is described, in which opposing drums have mating indented groove and projecting mandrel formations for forming the channel, the shape of the mating groove and mandrel corresponding to the desired conduit shape. One problem with this is that the two drums must be synchronized for proper operation.

Other problems inherent in existing drip irrigation tapes are that the drip outlets often become blocked with plant roots growing over or into them, for example, and that although winding secondary conduits have advantages over straight conduits, they are very difficult to make.

SUMMARY OF THE INVENTION

It is an object of this invention to provide a new and improved drip irrigation tape and method of manufacturing such tape.

According to one aspect of the present invention, a drip irrigation tape is provided which comprises a strip of thin, flexible material having an indented, continuous or segmented groove in one side edge extending lengthwise along the strip. The other side edge portion is folded lengthwise along the strip to cover the groove, and the two opposing side edge portions are secured together in face to face contact to form a first or main conduit within the folded strip and a secondary conduit along the or each groove. Inlets are provided between the main conduit and the or each secondary conduit, and outlets are provided between the secondary conduit or each secondary conduit segment and the exterior of the tape. The groove or each groove segment is shaped to form a winding flow path for water flowing along the secondary conduit, and comprises a series of oblong chambers interconnected by orifices of smaller dimensions than the chambers, with the chambers alternating in position from one side to the other side of the groove to form a serpentine or winding passageway. The chambers have opposite end walls which are rounded or radiused in opposite directions from one chamber to the next, to introduce a vortex or swirling, circular motion into the water flow, reducing the flow rate, increasing the water flow path and allowing the conduit to be made of larger dimensions. The swirling, turbulent motion will also tend to keep any debris moving along the conduit without blocking the flow path.

This arrangement of chambers and oppositely radiused end walls in successive chambers tends to direct water flow in opposite directions in successive chambers along the length of the conduit, producing turbulent, vortex flow conditions tending to reduce the water flow rate. This produces enhanced pressure compensation for variations in water pressure along the length or run of the conduit. The channel shape also acts to help dislodge any debris, since any debris blocking the secondary conduit will block flow, causing a large pressure back up tending to push debris along the system. The turbulent flow conditions will also tend to dislodge any debris.

This tape can be laid in much longer runs than was previously possible, and it has been found that a run of 1320 feet will have an 84% coefficient of uniformity along its length. Thus, the length of irrigation tape which can be laid has been more or less doubled with the tape of this invention.

Preferably, the outlets have raised annular rims projecting radially outwardly from the tubing. The raised outlets act as root deflectors, reducing the risk of roots growing over and into the outlets. Also, the strip preferably has a wall portion of reduced thickness as compared to the wall thickness of the remainder of the strip. This reduced thickness portion is located in the flat side area which will overlie the groove when the strip is folded to form the main conduit. This produces some pressure compensation, since the thinner wall portion will tend to flex into the groove, reducing its dimensions, with increased water pressure in the main conduit, thus reducing flow rate in the secondary conduit as the water pressure increases, and automatically increasing the flow rate as the water pressure decreases. The pressure compensation effect can be enhanced by making the channel wider and shallower, so that a slight flexing of the wall will produce a relatively large change in the channel cross-sectional area.

According to another aspect of the present invention, an apparatus for forming the drip irrigation tape is provided, which comprises an extruder for extruding a strip of flexible material, a rotatable shaping drum having an inwardly extending, continuous or segmented channel extending around its periphery with a serpentine shape matching that of the groove to be formed in the strip, a guide for guiding the extruded strip around part of the periphery of the drum with a first side edge portion overlying the channel, the channel having a plurality of spaced suction ports extending along its length, and a vacuum source connected to the suction ports via passageways within the drum to pull the side edge portion overlying the channel into the channel to form a groove of corresponding shape in the strip, some of the suction ports being of larger dimensions than others so that the suction at the larger ports is sufficient to pull a raised hole in the strip at that point, the raised hole forming an outlet from the tape. A folding mechanism is provided downstream of the shaping drum to fold the strip lengthwise with the first side edge portion and an opposite, second side edge portion overlapping to form a first conduit, and a sealing mechanism is provided for joining the first and second side edge portions together on opposite sides of the groove to form a seam in which the groove defines a secondary conduit.

Preferably, the guide for guiding strip around the drum includes an opposing drum having a projecting annular rib overlying a portion of the second side edge of the strip which will overlie the groove in the first side edge when the strip is folded. The rib will compress the underlying strip material which is still hot and moldable, reducing the strip wall thickness in this region. The thinner material overlying the groove will tend to flex into the groove by an amount dependent on the water pressure in the first conduit, producing pressure compensation.

According to another preferred aspect of the invention, the connection between the drum and the vacuum source includes a sealing mechanism designed to direct the vacuum only to those regions of the drum channel over which the tape extends. This avoids any loss of vacuum pressure as a result of vacuum being directed to vacuum ports elsewhere on the drum which are exposed to atmospheric pressure, and provides an increased vacuum pulling force allowing the strip to be pulled more precisely into the forming channel. This allows a standard vacuum pump to be used to form a serpentine or tortuous groove on a single shaping drum, avoiding the need for opposing shaping mandrels which have to be precisely matched and synchronized.

The drip irrigation tape and forming method and apparatus of this invention provides a convenient and relatively inexpensive way of making serpentine flow conduits to reduce flow rate, allowing the secondary conduit to be made of larger dimensions and providing improved drip rate uniformity over long runs of the tape. The increased vacuum makes the secondary conduit straighter and more uniform.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 is a side elevation view of an apparatus for forming drip irrigation tape according to a preferred embodiment of the present invention;

FIG. 2 is an enlarged top plan view of the shaping drum on the lines 2—2 of FIG. 1;

FIG. 3 is an enlarged top plan view of the sealing assembly;

FIG. 9 illustrates the folding of the flexible strip to form tubing;

FIG. 10 is a section on the lines 10—10 of FIG. 9;

FIG. 11 is a top plan view of a portion of the formed tubing;

FIG. 12 is an expanded plan view of part of the secondary conduit in FIG. 11 illustrating the swirling motion of water along the conduit;

FIG. 13 is a section on the lines 13—13 of FIG. 11;

FIG. 14 is a section similar to FIG. 13 illustrating the effect of increased water pressure in the main conduit;

FIG. 15 is a sectional view similar to FIG. 12 illustrating a secondary conduit with modified dimensions for enhanced pressure compensation;

FIG. 16 is a section on the lines 16—16 of FIG. 11;

FIG. 17 is a view similar to FIG. 11 illustrating a modification;

FIG. 18 is a top plan view of tubing according to another embodiment of the invention;

FIG. 23 is a view similar to FIG. 19 illustrating an alternative conduit;

FIG. 24 is a similar view illustrating a short emitter configuration;

FIG. 25 is an enlargement of a portion of the conduit of FIG. 23;

FIG. 26 is a sectional view taken on line 26—26 of FIG. 25;

FIG. 27 is a sectional view taken on lines 27—27 of FIG. 25;

FIG. 28 is a view similar to FIG. 25 illustrating an alternative baffle arrangement; and FIG. 29 is a sectional view taken on line 29—29 of FIG. 28.

DESCRIPTION OF THE PREFERRED EMBODIMENTS

Figure 5:
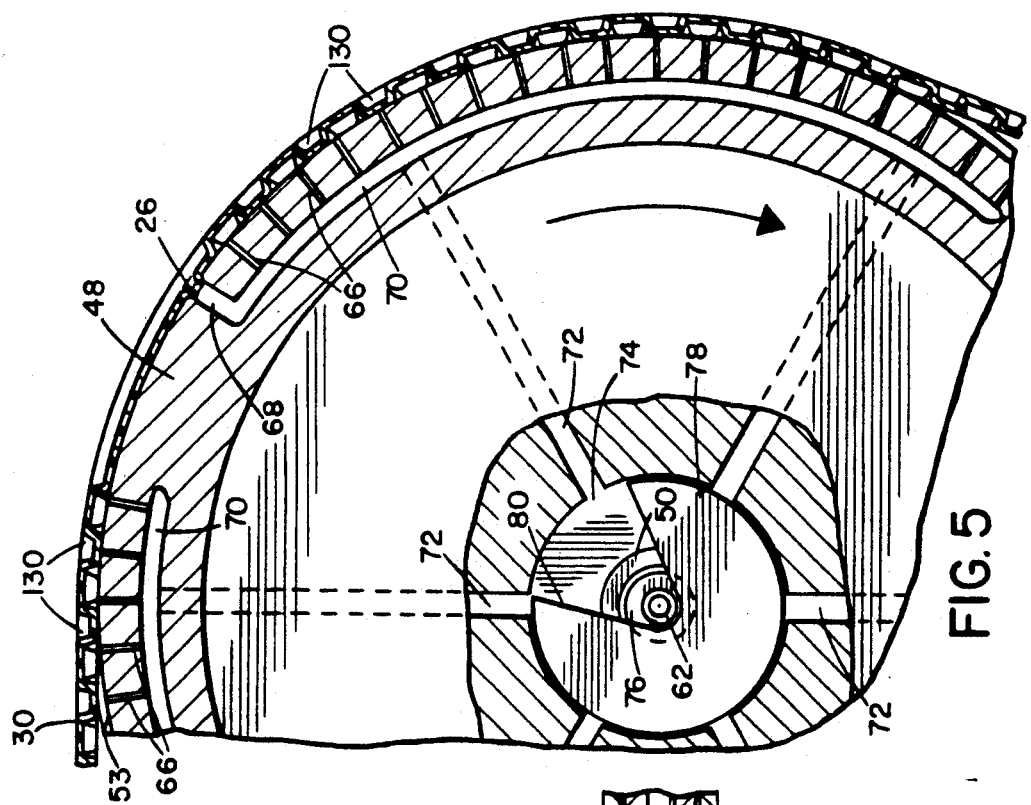
FIG. 5 is an enlarged section on the lines 5—5 of FIG. 4.

FIGS. 1-10 of the drawings illustrate an apparatus and method for forming a drip irrigation tape 10 according to a first embodiment of the present invention. The formed tape as illustrated in FIGS. 11-13 basically comprises a strip of thin, flexible, water impervious material such as polyethylene or silicone rubber, with a series of spaced, indented grooves 14 of generally serpentine shape formed along one side edge 16 of the strip, the opposite side edges 16 and 18 of the strip being folded into overlapping relationship and sealed together to form a main conduit 20 along the length of the strip and a series of spaced, secondary conduit segments 22 along each of the grooves 14. Inlets 126 are provided between the main conduit and the inlet end 24 of each secondary conduit segment 22, while outlet ports 25 having raised rims 26 are formed between each secondary conduit and the exterior of the tape.

In the preferred embodiment illustrated, the groove is discontinuous and comprises a series of spaced groove segments. However, it will be understood that the tape may alternatively be formed with a continuous groove of similar shape, having spaced inlets and outlets along its length for connecting the main conduit to the secondary conduit and the secondary conduit to the exterior of the tape.

Figure 7:
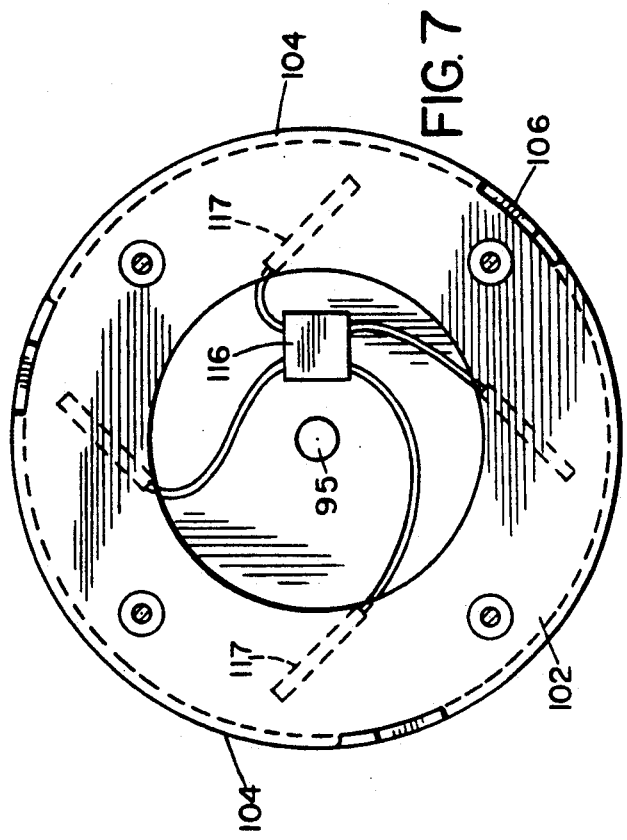
FIG. 7 is a sectional view taken on lines 7—7 of FIG. 3.
Figure 8:
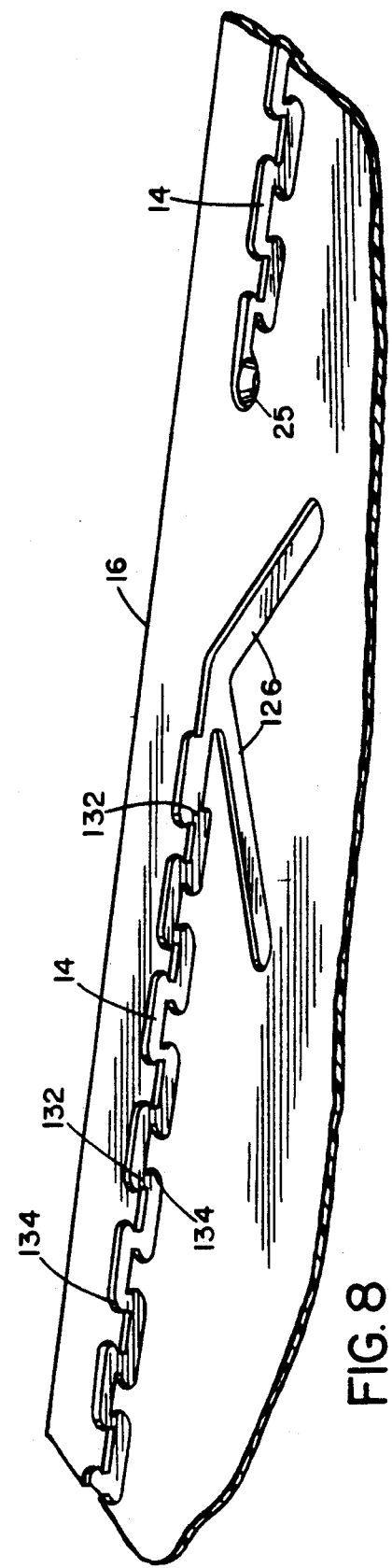
FIG. 8 is an enlarged detail of part of the side edge portion of the strip illustrating the preformed edge portion prior to folding.

A preferred embodiment of an apparatus for making the tape is illustrated in FIGS. 1-7, while FIGS. 8-10 illustrate stages in the manufacture. The apparatus includes an extruder 28 for extruding a strip 30 of material for forming the tape, and a shaping station 32 at which the grooves 14 are formed in side edge 16 of the strip while it is still molten from the extrusion process. A folding mechanism 34 is located downstream of the shaping station 32 for folding the strip with its opposite side edges overlapping, followed by heat sealing station 36 for sealing the overlapping side edges together to form the separate main conduit and secondary conduit segments. After the heat sealing station, the formed tape is passed over a series of guide rollers and cooling wheels 38 before being wound onto a storage spool 40.

As illustrated in FIG. 1, the various parts of the apparatus between the extruder and storage spool are supported on a frame or back plate 42 within a suitable outer housing (not illustrated). The extruder is of a known type for forming thin polyethylene or similar material film or strip, and includes a hopper 44 into which suitable raw material such as polyethylene beads are placed, and an extrusion die 46 through which a thin film of molten plastics material is forced. The die has a slot designed to form strip having a thickness in the range of around 0.005 to 0.02 inches (5 to 20 mils.). Preferably, the slot has an enlarged or thickened region to form a bulge in the extruded strip, at the area where the channel or groove is to be formed, so that the wall thickness of the formed groove will be at least 2 mil. greater than the remainder of the strip and may be up to 10 mil. thicker.

Figure 4:
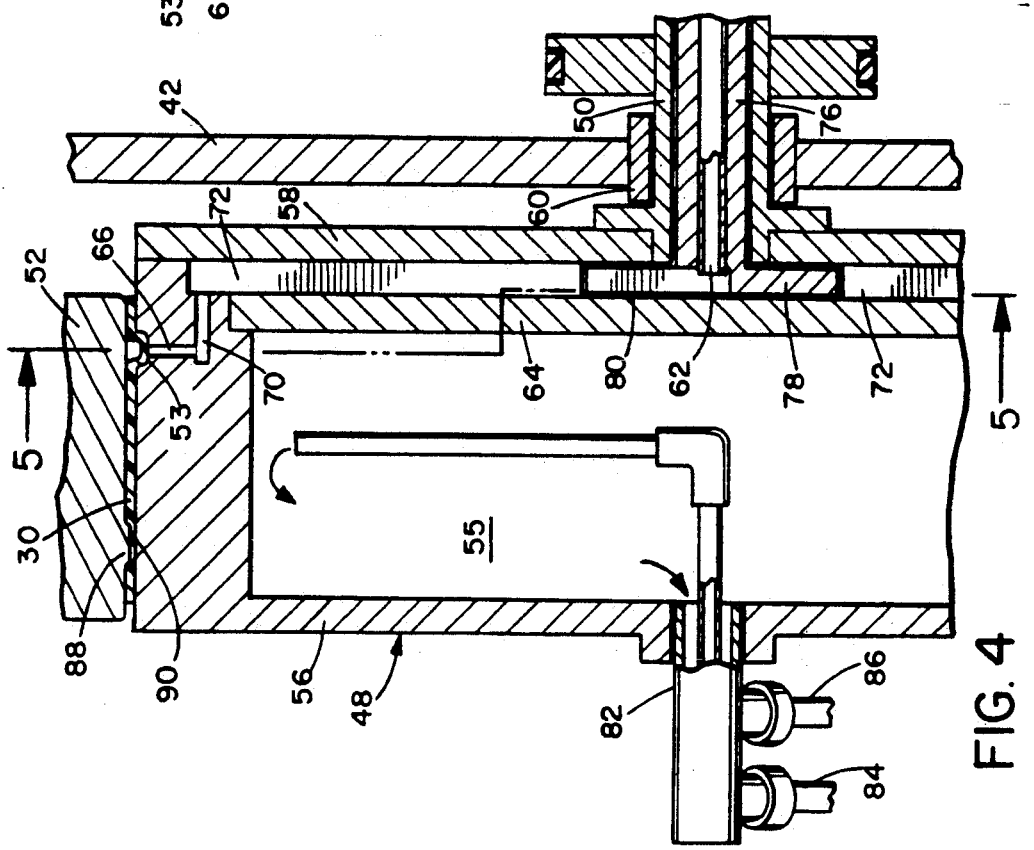
FIG. 4 is a section of the shaping assembly on the lines 4—4 of FIG. 1.

The shaping station assembly is best illustrated in FIGS. 2, 4 and 5, and comprises a shaping drum 48 rotatably mounted via axle 50 on back plate 42, and an opposing, rotatably mounted guide drum 52 for guiding and compressing the still molten strip onto the shaping drum 48. Strip 30 arriving at drum 48 will still be at a temperature of around 400 degrees Fahrenheit from the preceding extrusion step. As illustrated in FIG. 2, the drum 48 has a series of indented channels 53 extending around its periphery adjacent one side edge of the drum. The shape of the channels 53 corresponds to the desired shape of the secondary conduit segments 22 in the formed strip, and as illustrated in FIG. 2 each channel is of generally serpentine or zig-zag shape with a V-shaped portion 54 intersecting one end of each channel 53.

As best illustrated in FIGS. 4 and 5, the drum 48 has a hollow interior 55 between spaced front and back walls 56 and 58. Axle 50 projects from back wall 58 through a bearing 60 in back plate 42. An inlet tube 62 extending through axle 50 and back plate 58 connects the drum to a suitable vacuum source such as a vacuum pump. A dividing wall or plate 64 in the drum separates the vacuum inlet from the interior 55 of the drum. Each channel 53 has a series of suction ports 66 extending along its length, with one of the ports 68 at one end of the channel being of larger dimensions than the remaining ports. The ports 66, 68 are all connected via circumferential passageways 70 underlying each channel and radial passageways 72 formed in dividing wall 64 to a central chamber 74 in dividing wall 64. Vacuum inlet 62 extends through seal member 76 into the central region 74 of the plate. The seal member 76 has an enlarged head 78 at its inner end which is a close fit in chamber 74, as best illustrated in FIG. 5, with a segmental shaped cut-out 80 formed in head 78 to direct the vacuum only into some of the radial passageways 72 at any one instant of the drum's rotation forming a selective seal. As the drum rotates in the direction of the arrow in FIG. 5, plate 64 will rotate relative to stationary seal member 76, bringing successive passageways 72 into alignment with cut-out region 80 of the seal. This arrangement is such that the vacuum is directed only to those portions of the drum over which the strip is guided, and is therefore not exposed to the atmosphere through any of the uncovered suction ports. This allows the vacuum force to be concentrated in the regions where it is needed in order to suck the strip material into the underlying channels and form the shaped grooves. As the drum rotates in the direction of the arrow in FIG. 5, successive passageways will become aligned with cut-out 80 just as the strip 30 starts to travel over the channel connected to those passages, as best illustrated in FIG. 5, so that the vacuum is connected to the suction ports around the region of the drum illustrated in FIG. 5 only.

The force of the vacuum pulling the molten strip material into the channels will be sufficient to form grooves of corresponding shape to the channels along the side edge 16 of the strip. The larger suction ports 68 apply sufficient suction to pull holes in the strip material at one end of each channel, forming the outlet ports 25 with raised rims 26, which are best illustrated in FIG. 13. The drum is also connected via a rotary coupling 82 in the front wall to water inlet and outlet hoses 84, 86, which supply cooling water to the interior of the drum, cooling the strip as the grooves are formed.

As best illustrated in FIG. 4, the drum 52 has an annular, projecting rib 88 adjacent the opposite side edge to the channels 53 in drum 48. This compresses the underlying strip material to reduce the wall thickness in that region 90, as can be seen in FIG. 4. Alternatively, the drum may have a groove in this region to increase the wall thickness in the region 90, if desired, as will be explained in more detail below.

FIG. 8 illustrates a portion of the strip preformed with grooves 14 as it leaves the shaping drum. As the strip leaves drum 48, it is passed over several guide rollers 92 and into folding mechanism 34. The folding mechanism is of a known type and folds the strip lengthwise as generally illustrated in FIG. 9, so that the opposite side edge portions are overlapped with the first portion 16 having the indented grooves on the outside and the second portion 18 covering the grooves on the inside of the tubing, the thinner wall thickness region 90 being aligned with the grooves, as illustrated in FIG. 10, which illustrates the form of the tubing as it leaves the folding mechanism and is guided onto heat sealing drum 94 at the heat sealing station 36.

Figure 6:
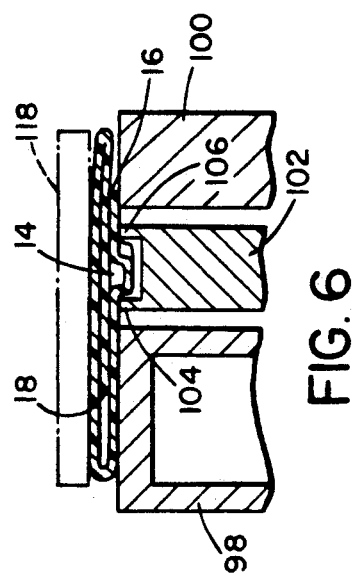
FIG. 6 is an enlarged sectional view taken on lines 6—6 of FIG. 1.

As best illustrated in FIGS. 3, 6 and 7 heat sealing drum 94 is rotatably mounted on back plate 42 via axle 95, and includes a recessed portion 96 separating the drum into a front portion 98 and a back portion 100. A brass heat sealing wheel 102 having raised annular ribs 104, 106 extending along its opposite edges is set into recessed portion 96 of the heat sealing drum 94. Inclined transverse ribs 108 extend between the annular ribs at spaced intervals corresponding to the gaps between adjacent grooves in the formed tubing. Flat spots or gaps 110 are formed in the rib 104 adjacent each transverse rib 108. The heat sealing wheel 102 is heated via a suitable electrical heating arrangement, as best illustrated in FIG. 7. Suitable means such as commutator rings 112 and contacts 114 serve to couple an external power supply (not shown) to a junction box 116, from which it is coupled to electrical cartridge resistors 117 attached to the heat sealing wheel.

The shaping drum and heat sealing drum are rotated in synchronism by a suitable drive mechanism. As the folded strip passes around the heat sealing drum, the grooved portion will overlie the recessed portion of the drum, as illustrated in FIG. 6. The strip is pressed against the heat sealing wheel by a pressure belt assembly 118, and the raised ribs apply pressure to the overlapped portions of the strip, at the same time heating the strip to melt the strip material and form heat seal lines 120, 122 extending along opposite sides of the grooves and spaced outwardly from the grooves, as best illustrated in FIG. 11. Flat or recessed spots 110 along rib 106 separate the rib from the strip material in this region to produce breaks or gaps 124 in one of the seal lines 120, and these gaps are aligned with the V-shaped portions or inlets 126 at the end of each groove formed by the corresponding V-shaped portion of the shaping drum. This produces a break in the seam or an inlet 24 connecting the interior of the tube, or the main conduit 20, to each secondary conduit 22.

The transverse ribs form a corresponding transverse seal line 128 between heat seal lines 120, 122 between each adjacent pair of grooves or secondary conduits 22, separating the secondary conduits from each other. After leaving the sealing station 36, the formed tape is guided around guide rollers and cooling wheels 38 before being wound onto the storage spool 40 at the outlet of the apparatus.

Since the overlapping side edge portions of the tape are sealed together in face to face contact with no intervening material between the overlapping portions along the seal lines, the depth of groove controls the dimensions of the secondary conduit, and allows the dimensions, and thus the flow rate, to be relatively constant along the length of the tape.

The finished irrigation tape or tubing may be cut to any desired length and laid on or in the ground in a region to be irrigated with one end connected to a water supply. Water supplied at one end will flow along the main conduit 20 within the tubing, and will communicate via inlets 24 with each secondary conduit 22. Water flowing along the tortuous, serpentine secondary conduits 22 will trickle at a relatively slow and constant rate out of raised outlets 25. The raised rim 26 of outlets 25 will tend to deflect any roots or other debris which may otherwise grow over or into the outlets, potentially blocking the outlets from some secondary conduits and producing irregular irrigation. Although only one outlet 25 is illustrated at the end of each secondary conduit, two or more outlets may be provided so that the flow is not cut off if one of the outlets should become blocked.

The shape of the serpentine groove is best illustrated in FIGS. 11 and 12. The groove is shaped to form a series of elongate chambers 130 offset alternately on opposite sides of the grooved region and interconnected by orifices 132 of reduced dimensions between adjacent ends of each pair of chambers. The ends 134 of the chambers are rounded or radiused, and the ends of adjacent chambers overlap one another to form a generally S- or Z-shaped path between adjacent chambers, as illustrated by the arrows in FIG. 12 between two adjacent chambers. The radiused ends introduce a swirling, circular or vortex-type of flow pattern in water at each end of each chamber 130, increasing the flow path and reducing the flow rate. The water flow will change direction from one chamber to the next, from a clockwise to an anti-clockwise generally circular motion, as illustrated by the arrows in FIG. 12. This swirling flow will reduce the flow rate along the conduit, allowing the conduit dimensions to be made larger for a predetermined drip rate and thus reducing the risk of debris blocking the conduit. The swirling, vortex-type flow also produces a better pressure drop. The swirling liquid motion will also tend to keep any debris moving along the conduit, reducing the risk of debris accumulating to block the flow.

Preferably, the wall thickness of the portion 90 of the side edge which overlies conduits 22 is reduced, as illustrated in FIGS. 13 and 14. The wall thickness of the tubing will generally be in the range of 5 to 15 mil. around the periphery of the main conduit, with the groove itself having a greater thickness of the order of 2 to 10 mil. over the remainder of the wall, as mentioned above. Preferably, the reduced thickness region 90 will have a wall thickness of the order of 5 to 8 mil. This reduced thickness combined with the overall flexibility and memory of the polyethylene material forming the tubing allows region 90 to flex or stretch into the secondary conduit both along inlets 126 and along the length of the secondary conduit segment 22 as the pressure in the main conduit 20 increases. This effect is illustrated in FIG. 14. The reduced thickness region 90 will tend to bulge inwardly into the secondary conduit under increased fluid pressure P in the main conduit, reducing the dimensions and thus the flow rate in the secondary conduit. When the pressure is reduced, the region 90 will relax back outwardly to increase the secondary conduit dimensions. Alternatively, where less stretching is required, for example under higher flow conditions, region 90 may be made thicker than the remainder of the tubing.

In one example, say the total pressure on the inner side of wall 90 is c square inches $\times$ 6 p.s.i. where c is the surface area. If c is 10 square inches then the pressure is 6 $\times$ 10 or 60 pounds. If the pressure on the other side of wall 90, within the secondary conduit, is 0.5 p.s.i., say, the pressure is 10 square inches $\times$ 0.5 or 5 pounds so the net outward pressure on wall 90 is 60 $-$ 5 or 55 pounds (5.5 pounds per square inch). The pressure on the outer wall of secondary conduit 22 is about 12 square inches $\times$ 0.5 or 6 pounds. The pressure on inner wall 90 is thus 12 times that on the outer wall of the secondary conduit. This however, is not entirely controlled by the respective thickness of the inner and outer walls. The pressure is controlled by the strength of section 12 against stretching and the incompressible liquid in outer channel 22. However by making wall region 90 sufficiently thin, it can stretch more, allowing more of the water pressure in the main conduit to be exerted on the secondary conduit, producing improved pressure compensation.

This arrangement allows the dimensions of the secondary conduit to be varied to a certain extent dependent on water pressure in the main conduit. This produces some compensation for variations in water pressure which would otherwise cause major variations in the drip rate. When the water pressure in the tubing goes up, the thin wall region will tend to flex inwardly into the channel, reducing the dimensions of the secondary conduit and thus reducing the flow rate along the secondary conduit and ultimately the drip rate. The inlet passageway dimensions will also be reduced. As the water pressure goes down, the region will relax outwardly and increase the secondary conduit dimensions. This allows a much more uniform drip rate to be achieved along relatively long runs of tape.

This pressure compensation effect can be increased with the modification illustrated in FIG. 15. In this embodiment, the secondary conduit 222 is made wider and shallower than in FIGS. 13 and 14, although it preferably has the same basic serpentine shape as illustrated in FIG. 12. Additionally, the groove 214 is completely rounded or radiused in cross-section, with no square corners as in FIG. 13. This can be achieved by suitably machining the channels 53 in the shaping drum to form rounded or radiused channels, so that the channel is arcuate in cross section along its length. As in the version of FIGS. 13 and 14, the inner wall section 290 of the conduit is thinner than that of the remainder of the wall surrounding main conduit 220, and will therefore tend to bulge under increased fluid pressure. This will reduce the dimensions of secondary conduit 222, as indicated in dotted outline in FIG. 15. The secondary conduit may have a depth of the order of 0.003 to 0.004 inches and a width of up to 0.1 inch, for example, in this version, to produce a very sensitive pressure compensation. With this arrangement, only a very slight flexing of region 290 will produce a relatively large difference in the cross-sectional area of conduit 222, thus reducing the flow rate as the pressure increases and compensating for pressure variations along the length of the tubing.

With this tubing, the vortex turbulent flow in the secondary conduit allows the grooves to be of larger dimensions and the secondary conduit to be shorter while still maintaining a relatively low flow rate. The depth of the grooves may be of the order of 10 to 30 mils., for example, with the chambers 130 having a width of up to 100 mils. The increased vacuum force directed only to the region of the drum where it is needed forms the grooves accurately and precisely matching the channels in the shaping drum. The enlarged secondary conduit dimensions combined with the flow characteristics of the serpentine groove substantially reduce the risk of debris blocking any secondary conduit. This permits longer runs of tubing to be used, with of up to 1320 feet being found to have around 84% coefficient of uniformity. Thus, much larger areas can be covered with a single run of tubing than was previously possible without loss of uniformity in the drip rate and corresponding lack of uniformity in the crop. The elongate flow chambers 130 combined with the swirling, vortex flow allow more time for pressure compensation to take effect. In a laminar flow secondary conduit, the outlet flow rate will more or less double if the water pressure doubles. With secondary conduits of the shape illustrated in FIGS. 11 and 12, a doubling in the water pressure increases output flow only 50%.

FIG. 17 illustrates a modification to the seal arrangement in the tubing of the previous embodiments. The tubing of FIG. 17 is otherwise identical to that of the first embodiment and like reference numerals have been used where appropriate. In the modified version of FIG. 17, an additional seal region 121 is provided transversely between the legs of the V-shaped inlet grooves 126 and in alignment with one of the seal lines 120. The seal region 121 has tapered or inclined ends which match the taper of the respective adjacent inlet channels 126, as illustrated in FIG. 7. Additionally, seal lines 120 and 122 have enlarged, opposing seal regions 123, 125 which extend inwardly up to the opposite sides of the secondary conduit or groove 22 adjacent the inlet end of each secondary conduit segment. These additional seal regions 121, 123 and 125 may be formed by suitable modification of heat sealing ribs on the heat sealing drum 94.

With these additional seal areas at the inlet end of each secondary conduit segment, any tendency for the overlapping side edge portions of the strip to spread apart at the inlet and allow additional water to flow into the secondary conduit is eliminated, since these edge portions are positively sealed together. With the arrangement of FIG. 11, there may be some tendency for the overlapping regions of the strip to separate under high pressure conditions, particularly between the V-shaped inlet channels 126, to form a bridge and allow a greater flow rate of water into the secondary conduit.

The additional seal regions in FIG. 17 will avoid this possibility.

Drip irrigation tape is typically provided in a range of standard outlet spacings, dependent on grower's requirements. This range is 8", 12", 16" and 24" outlet spacings. For each outlet spacing, the secondary conduit will be dimensioned and designed to produce a predetermined drip rate in gallons per minute per hundred feet of tape, for example 2/10 and 4/10 gallons per minute. Clearly, if the same secondary conduit is provided between outlets for a 12" outlet spacing and a 24" outlet spacing, i.e. with the secondary conduit segment being double the length for the 24" outlet spacing, the drip rate will be lower for the 24" tape than for the 12" tape. This variation may be avoided either by varying the dimensions of the 24" outlet tape to increase the flow rate, or by using the same length secondary conduit in both cases. For example, for the former alternative, a secondary conduit shaped and dimensioned to provide 4/10 gal/min/100 feet in a 12" outlet spacing will provide approximately 2/10 gal/min/100 feet in a 24" outlet spacing tape. The latter alternative of using the same length secondary conduit segment for every outlet spacing is illustrated in FIG. 18. The shape of the secondary conduit segments 22 and other components of FIG. 18 are equivalent to the embodiment illustrated in FIG. 11, and like reference numerals have been used where appropriate.

In FIG. 18, the spacing between outlets 25 is twice that of the version of FIG. 11, but each secondary conduit segment 22 has the same length as in FIG. 11, with a region 310 between adjacent conduit segments 22 being blanked or sealed off by transverse seal lines 312 extending between seal lines 120 and 122. The configuration of the secondary conduit segments 22 is identical to that of FIG. 11, in which the conduit segments extend for substantially the entire length between adjacent outlets.

In practice, any suitable secondary conduit length may be selected for use with all outlet spacings, from 1" upwards, with the region between adjacent segments simply being blanked off. This allows the outlet flow rate to be controlled more easily for any outlet spacing. The advantage of using a standard secondary conduit length is that design expense is reduced, since the same variation in secondary conduit dimensions will produce the same change in flow rate for any outlet spacing. However, there are also some benefits in running the secondary conduit segment for the entire length between adjacent outlets, for example this permits the secondary conduit to be made larger since the flow rate is reduced by providing a longer flow path to the outlet, at the same time reducing the risk of clogging and providing more scope for pressure compensation.

Tape may be manufactured in a range of different outlet spacings, either with secondary conduits segments extending between outlets or with appropriate blanked off regions as in FIG. 18, simply by providing an equivalent range of shaping drums 48 with appropriately shaped channels 53, with or without blanked off regions between adjacent channels.

Figure 19:
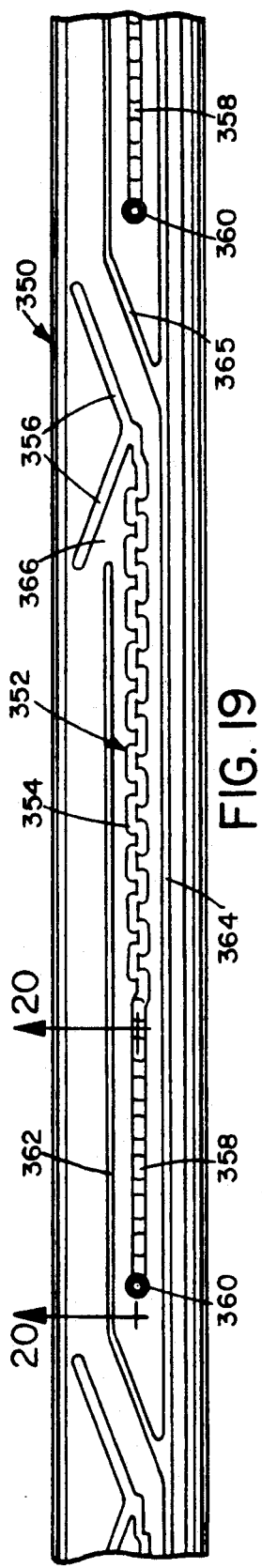
FIG. 19 is a top plan view of irrigation tubing according to another embodiment of the invention.
Figure 20:
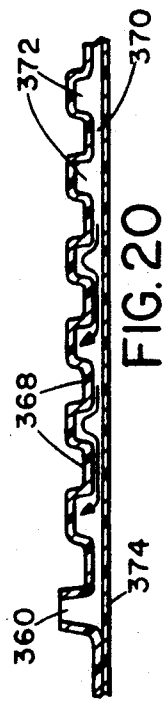
FIG. 20 is a sectional view on the lines 20—20 of FIG. 19.

FIGS. 19 and 20 illustrate another embodiment of the invention in which drip irrigation tape 350 is formed in the same manner as tape 10 in FIG. 11 but the secondary conduit segments 352 are each formed with a serpentine or winding portion 354 extending from inlet channels 356 in which water is directed back and forth, and a second, pressure compensating section 358 extending from winding portion 354 to raised outlet 360, which is equivalent to raised outlet 25 in the first embodiment.

As in the first embodiment, the tape is made by first forming a series of indented groove segments along one side edge of the tape in the appropriate shape for forming the secondary conduit segments, and then folding the tape with the side edges overlapped before sealing them together along spaced seal lines 362, 364, with transverse seal lines 365 extending between the seal lines to separate adjacent secondary conduit segments, and gaps 366 in the seal line 362 at each V-shaped inlet channel. The pressure compensating section 358 comprises a straight groove, with a series of indented steps 368 in its base forming barriers in the channel for directing water in an up and down direction, as best illustrated in FIG. 20, rather than transversely back and forth. This stepped section forms successive small size orifices 370 and enlarged pressure relieving chambers 372. As in the previous embodiments, the opposing flat side edge portion 374 of the tape is formed with a reduced thickness wall portion opposing the groove in the opposite side edge portion, as can be seen in FIG. 20.

With this arrangement, as the pressure inside the main conduit increases, the reduced thickness portion of wall 374 will tend to bulge outwardly towards indented steps 368, reducing flow towards the outlet by an amount substantially proportional to the increase in pressure. At the same time, the water is directed up and down to follow the stepped configuration of the secondary conduit, introducing up and down turbulence and similarly reducing and controlling flow. Thus, an equivalent outlet flow rate can be produced for a secondary conduit of larger dimensions than an equivalent laminar flow secondary conduit. If the pressure compensating section should become blocked by debris at any of the small orifices 370, back up pressure will force the opposing surfaces of the conduit apart and push the debris into the next adjacent pressure relieving chamber 372.

Figure 21:
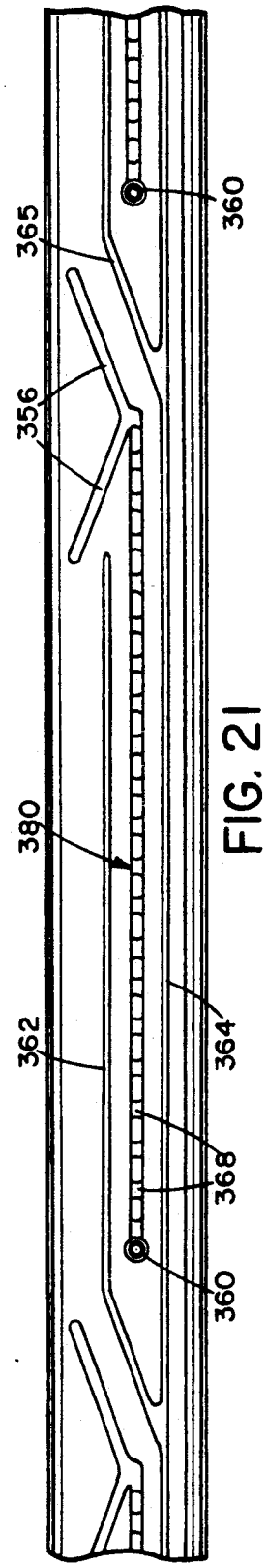
FIG. 21 illustrates tubing according to another modified embodiment of the invention.
Figure 22:
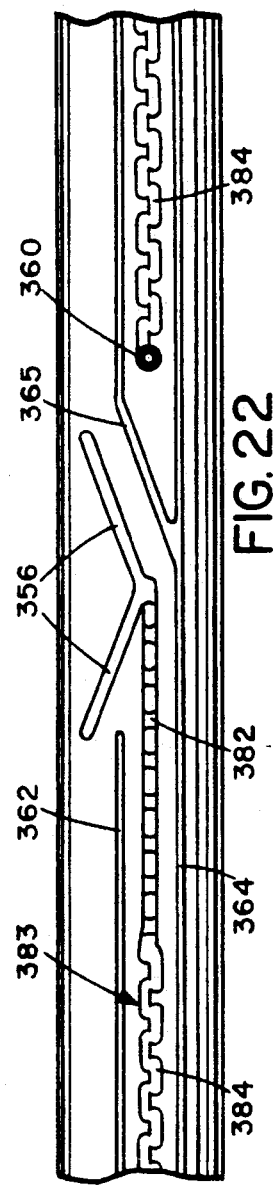
FIG. 22 illustrates another alternative embodiment of the invention.

FIG. 21 illustrates a modification in which the entire secondary conduit segment 380 is of the same shape as the pressure compensating section at the outlet end in FIG. 19, while FIG. 22 illustrates an embodiment in which a pressure compensating section 382 is provided at the inlet end of a secondary conduit segment while the remainder 384 of the secondary conduit segment is of equivalent shape to the inlet section in FIG. 19. In both FIGS. 21 and 22, like reference numerals to FIG. 19 have been used for like parts. Both of these alternative versions will produce turbulent, up and down flow along at least part of the length of each secondary conduit segment with improved pressure compensation via the gradual closing of the small orifices between adjacent pressure relieving chambers as the pressure within the main conduit rises. This arrangement has been found to provide good pressure compensation with little variation in the output flow rate as pressure increases within the tubing.

The stepped groove is formed by a shaping wheel equivalent to shaping wheel 48 but having channels with a similar stepped formation along part or all of their length.

FIG. 23 illustrates another modification in which the entire secondary conduit segment 390 is of winding or serpentine shape, as in the first embodiment, and pressure compensating barriers 392 are formed in each of the chambers 394 between adjacent turns 396 of the winding channel. Although in the illustrated embodiment the pressure compensating barriers are provided along the entire length of the secondary conduit, the pressure compensating region may alternatively extend only part of the length of the secondary conduit, for example adjacent the outlet as in FIG. 19 or adjacent the inlet as in FIG. 22 or anywhere else in the conduit. Only one inlet channel 395 is provided at the inlet end of the secondary conduit. The inlet may be deeper than the rest of the conduit. This version may alternatively have two inlets as in the other embodiments. The drip irrigation tape in this embodiment is otherwise identical to that of FIG. 19. Like reference numerals have been used as appropriate. The barriers 392 are illustrated in more detail in FIGS. 25 to 27, and are formed by a series of indented steps 398 formed in the grooved side edge portion of the tape, one step being formed at the center of each chamber 394. Preferably the steps are of rounded, generally arcuate shapes, as illustrated in FIG. 27, although other shapes such as, rectangular or elliptical may be used, and the height of the step may be varied to suit the particular application. As in the previous embodiments of FIGS. 19–22, the steps may be formed by an equivalent stepped formation in the shaping wheel forming the serpentine groove.

The steps or barriers 392 form a series of successive small size orifices 399 and enlarged pressure relieving chambers in the secondary conduit. As in the embodiment of FIG. 19, this will tend to reduce the flow rate in a pressure compensating manner, since the small orifices will gradually close more and more with increase in pressure within the main conduit. The overall effect will be a relatively constant output flow rate regardless of variations in the water pressure in the tubing.

FIGS. 27 and 28 illustrate an alternative pressure compensating arrangement in which barriers 400 are provided in the turns or bends 402 of the serpentine passageway rather than in the chambers between adjacent turns as in FIG. 23. The drip irrigation tape in this alternative will be otherwise identical to that of FIG. 23. As best illustrated in FIG. 28, the barriers 400 are formed by constrictions or steps 402 at the base of the groove formed in one side edge portion of the tape, but the steps in this case are located at turns in the serpentine groove to form a reduced size orifice 404 at each bend or turn between adjacent enlarged chambers 406 in the passageway. Again, this will tend to compensate for any pressure variations to produce a substantially constant output flow rate.

FIG. 24 illustrates another alternative embodiment of the invention which is similar to the embodiment of FIG. 18, and like reference numerals have been used where appropriate. As in FIG. 18, short secondary conduit segments 410 are provided, which are significantly shorter than the distance between adjacent outlets 25. However, unlike FIG. 18, the conduit segments 410 are straight and have a series of spaced barriers or steps 412 along their length as in the embodiment of FIG. 21, in order to produce a turbulent, up and down flow along the length of each segment 410. The barriers form small orifices between adjacent pressure relieving chambers 414, and the orifices will tend to close gradually as pressure within the main conduit increases, reducing flow rate with increased pressure to produce little variation in output flow rate as pressure within the tubing changes. As in FIG. 18, the region 310 between adjacent conduit segments 410 is blanked or sealed off by transverse seal lines 312 extending between seal lines 120 and 122.

Although a preferred embodiment of the present invention has been described above by way of example only, it will be understood by those skilled in the field that modifications may be made to the disclosed embodiment without departing from the scope of the invention, which is defined by the appended claims.

I claim:

1. A drip irrigation tape, comprising:
   a strip of flexible material having at least one indented groove in one side edge extending lengthwise along the strip, the opposite side edge being folded lengthwise along the strip to cover the groove;
   the opposing side edges of the strip being secured together in face to face contact along opposite sides of the groove to form a main conduit within the folded strip and at least one secondary conduit along the groove;
   the strip having at least one inlet connecting the main conduit to the or each secondary conduit, and at least one outlet connecting the or each secondary conduit to the exterior of the tape, each outlet having a raised annular rim projecting radially outwardly from the tape; and
   the groove having a generally serpentine shape extending along a grooved region, the groove comprising a series of elongated chambers offset alternately on opposite sides of the grooved region, each pair of adjacent chambers being interconnected by a connecting orifice of smaller dimensions than the chambers at adjacent ends of the respective chambers, at least the end walls of the chambers being rounded to introduce circular directional motion into water flowing through the chambers.

2. The tape as claimed in claim 1, wherein the wall thickness of a portion of said side edge covering the groove is less than the thickness of the remainder of the strip.

3. The tape as claimed in claim 2, wherein the wall thickness of the groove is greater than that of the remainder of the strip.

4. The tape as claimed in claim 3, wherein the groove has a wall thickness between 2 and 10 mil. thicker than the remainder of the strip.

5. The tape as claimed in claim 2, wherein the wall thickness of said portion overlying the groove is between 5 to 8 mil.

6. The tape as claimed in claim 1, wherein adjacent chambers have overlapping ends and each connecting orifice forms a generally S-shaped connection between the chambers, the S-shaped connections being oppositely directed at opposite ends of each chamber to reverse the water flow direction.

7. The tape as claimed in claim 1, wherein a series of spaced, segmented grooves are formed along the length of the strip to form a series of spaced secondary conduits, each secondary conduit having at least one inlet at one end and one outlet at the opposite end.

8. The tape as claimed in claim 1, wherein the or each inlet comprises a V-shaped groove intersecting one end of said serpentine groove at the apex of the V-shape to form a pair of inlet channels converging towards one another, and the opposing side edges of the strip are sealed together in the region between the inlet channels of each V-shaped inlet.

9. A drip irrigation tape, comprising:

a strip of flexible material having a series of spaced, segmented indented grooves in one side edge extending lengthwise along the strip, the opposite side edge being folded lengthwise along the strip to cover the grooves;

the opposing side edges of the strip being secured together in face to face contact along opposite sides of each groove to form a main conduit within the folded strip and a series of spaced secondary conduits along the grooves;

the strip having an inlet connecting the main conduit to one end of each secondary conduit, and an outlet connecting the opposite end of each secondary conduit to the exterior of the tape;

the grooves each having a generally serpentine shape extending along a grooved region, each groove comprising a series of elongated chambers offset alternately on opposite sides of the grooved region, each pair of adjacent chambers being interconnected by a connecting orifice of smaller dimensions than the chambers at adjacent ends of the respective chambers, at least the end walls of the chambers being rounded to introduce circular directional motion into water flowing through the chambers; and the spacing between the outlet ends of successive secondary conduits being greater than the length of each secondary conduit, and the opposing side edges of the strip being sealed together over an extended area between adjacent secondary conduits to form a blanked off region.

10. A drip irrigation tape, comprising:

a strip of flexible material having a series of spaced, segmented indented grooves in one side edge extending lengthwise along the strip, the opposite side edge being folded lengthwise along the strip to cover the grooves;

the opposing side edges of the strip being secured together in face to face contact along opposite sides of the grooves to form a main conduit within the folded strip and a series of spaced secondary conduits along the respective grooves;

each secondary conduit having an inlet at one end connecting the main conduit to the secondary conduit, and at least one outlet at the opposite end connecting the secondary conduit to the exterior of the tape;

each groove having a generally serpentine shape extending along a grooved region, each groove comprising a series of elongated chambers offset alternately on opposite sides of the grooved region, each pair of adjacent chambers being interconnected by a connecting orifice of smaller dimensions than the chambers at adjacent ends of the respective chambers, at least the end walls of the chambers being rounded to introduce circular directional motion into water flowing through the chambers; and the opposite side edges of the strip being secured together along spaced seal lines extending along opposite sides of the groove segments, the seal lines including inwardly extended seal regions adjacent the inlet end of each secondary conduit which extend up to the opposite sides of said grooved region.

11. The tape as claimed in claim 10, wherein each secondary conduit includes a pressure compensating region extending along at least part of its length, the pressure compensating region having a stepped wall forming a series of barriers in said secondary conduit defining successive small orifices and enlarged pressure relieving chambers between adjacent orifices.

12. The tape as claimed in claim 11, wherein the pressure compensating region comprises at least part of the length of said serpentine groove.

13. The tape as claimed in claim 12, wherein said stepped wall forms at least one barrier in each of said elongated chambers.

14. The tape as claimed in claim 12, wherein said stepped wall forms a barrier at the junction between each pair of adjacent chambers.

15. The tape as claimed in claim 11, wherein the pressure compensating region extends up to the outlet end of each secondary conduit.

16. The tape as claimed in claim 11, wherein the pressure compensating region extends from the inlet end of each secondary conduit.

17. The tape as claimed in claim 11, wherein the pressure compensating region extends the entire length of the secondary conduit.

18. The tape as claimed in claim 10, wherein the chambers comprise pressure compensating chambers and have a width greater than their depth.

19. The tape as claimed in claim 10, wherein the groove is arcuate in transverse cross section.

20. A drip irrigation tape, comprising:

a strip of flexible material having at least one indented groove in one side edge extending lengthwise along the strip, the opposite side edge being folded lengthwise along the strip to cover the groove;

the opposing side edges being secured together in face to face contact along opposite sides of the groove to form a main conduit within the folded strip and at least one secondary conduit along the groove;

the strip having at least one inlet connecting the main conduit to the or each secondary conduit and at least one outlet connecting the or each secondary conduit to the exterior of the tape; and the groove having a stepped base wall along at least part of its length forming a series of successive up and down steps for directing water flow in an up and down path, the stepped base wall forming with the opposing side edge of the strip a series of alternating small steps and enlarged pressure relieving chambers.

21. The tape as claimed in claim 20, wherein the groove is of winding, serpentine shape comprising a series of elongated chambers offset alternately on opposite sides of the grooved region and interconnected by bends in the groove between each adjacent pair of channels.

22. The tape as claimed in claim 21, wherein at least one step is located in each of said chambers.

23. The tape as claimed in claim 21, wherein each step is located at a respective bend in the groove.

24. The tape as claimed in claim 20, wherein the or each groove has a stepped base wall extending along its entire length.

25. The tape as claimed in claim 20, wherein the or each groove has a stepped base wall extending along part of its length.

* * * * *